Sept. 21, 1937.   L. E. LA BRIE   2,093,638
BRAKE
Filed Aug. 12, 1935   4 Sheets-Sheet 2

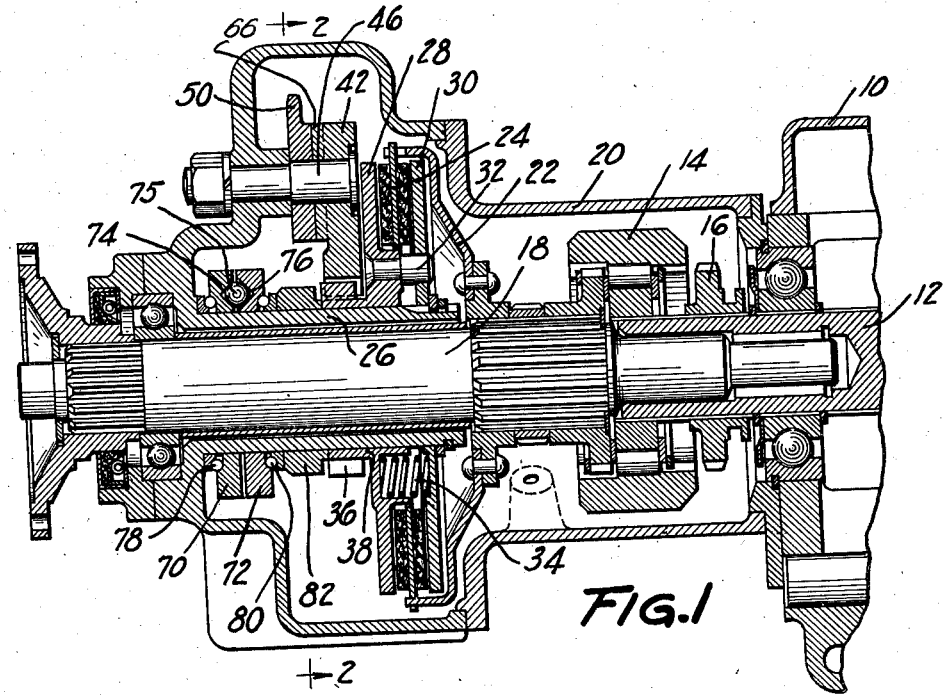
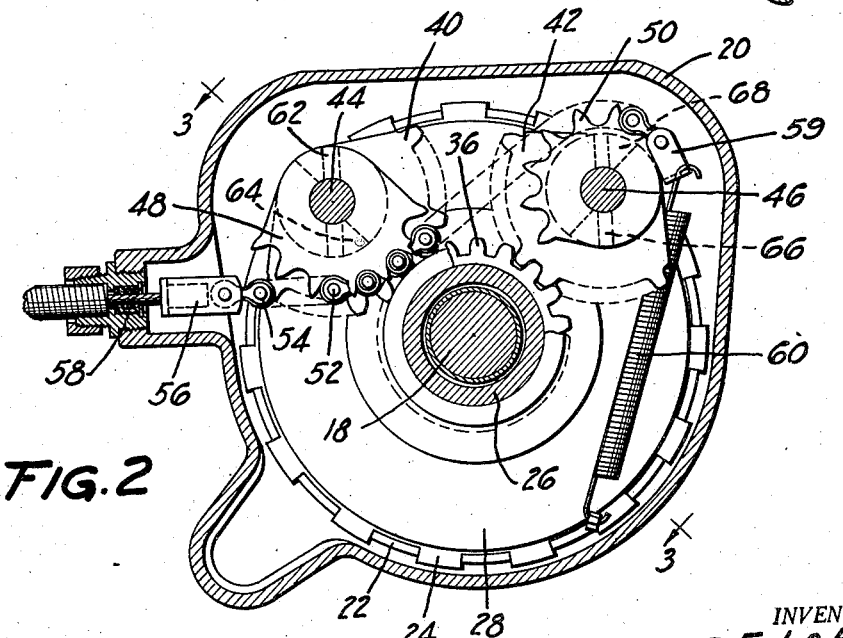

INVENTOR.
LUDGER E. LA BRIE
BY Jerome R. Cox
ATTORNEY

Sept. 21, 1937.                L. E. LA BRIE                2,093,638
                                   BRAKE
                            Filed Aug. 12, 1935           4 Sheets-Sheet 3

INVENTOR.
LUDGER E. LABRIE
BY Jerome R. Cox
ATTORNEY

Sept. 21, 1937.  L. E. LA BRIE  2,093,638
BRAKE
Filed Aug. 12, 1935  4 Sheets-Sheet 4

INVENTOR.
LUDGER E. LA BRIE
BY Jerome R. Cox
ATTORNEY

Patented Sept. 21, 1937

2,093,638

UNITED STATES PATENT OFFICE 2,093,638

BRAKE

Ludger E. La Brie, South Bend, Ind., assignor to Bendix Products Corporation, South Bend, Ind., a corporation of Indiana Application August 12, 1935, Serial No. 35,790

12 Claims. (Cl. 188—140)

This invention relates to mechanical power brakes and more particularly to friction mechanism adapted to operate in conjunction with a drive shaft of an automobile vehicle to develop a suitable torque to operate wheel brakes.

The invention is especially directed to a friction device adapted to derive torque from a drive shaft of the vehicle and novel means for transforming the torque so derived into useful brake actuating forces.

Accordingly, an object of the invention is to provide in a mechanical power brake of the type described a novel combination of friction device for deriving torque and means for resolving the derived torque into a useful force.

Another object of the invention is to provide in a mechanical power brake of the type described novel means for resolving torque which may be in either direction to a useful force acting in one direction.

A further object of the invention relates to the employment of chains and sprockets to accomplish the hereinabove set forth object.

The above and other objects and novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Figure 1 is a longitudinal section taken through the power brake mechanism showing the details thereof;

Figure 2 is a transverse section taken through Figure 1 approximately on the line 2—2;

Figure 3:
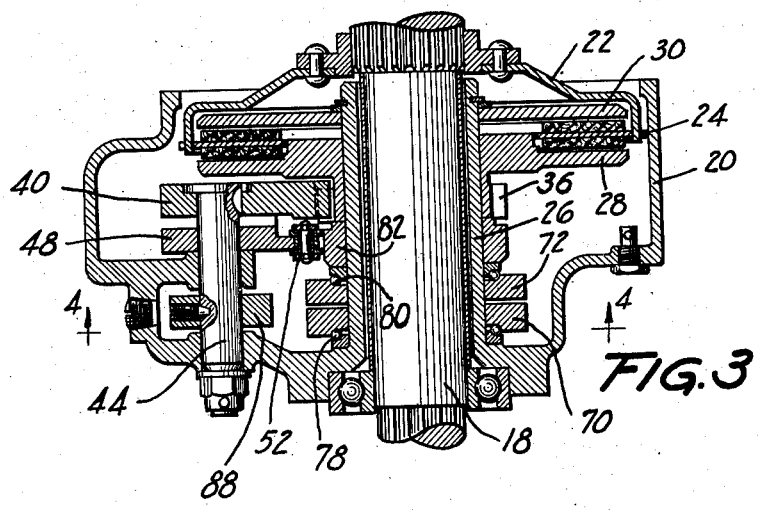
Figure 3 is a section taken on the line 3—3 of Figure 2.
Figure 4:
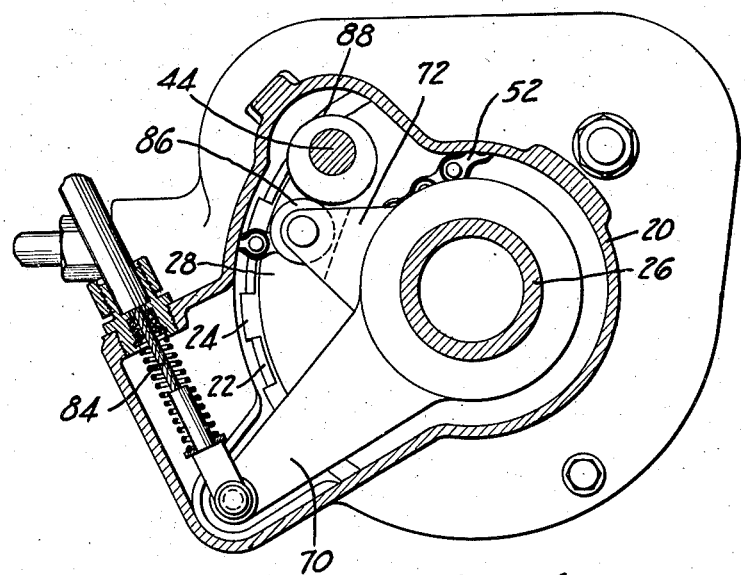
Figure 4 is a transverse section taken on the line 4—4 of Figure 1.

Referring more particularly to Figures 1 to 4 inclusive, and Figure 1 particularly, there is shown a transmission gear casing 10 having a drive shaft 12 projecting therefrom. In the particular arrangement shown, an overrunning free wheel clutch 14 is illustrated with a lock-out device 16 although the same may be dispensed with. To the rear of the free wheeling unit is splined a second drive shaft 18 which traverses the casing 20 secured to the transmission casing 10.

Splined to the shaft 18 is a spider 22 carrying an annular friction disc 24 axially movable with respect to the spider. On a hollow stationary stub shaft or support 26 which is integral with the casing 20 and through which the drive shaft 18 passes, is provided a pair of relatively stationary friction discs 28 and 30 which are pinned together at 32 to prevent relative rotation and provided with springs 34 to normally space the discs out of engagement with the disc 24. A pinion 36 forming a part of a sleeve 38 secured to one of the discs 28 meshes with a pair of sector gears 40 and 42 each mounted upon a separate stub shaft 44 and 46. Also carried on the stub shafts 44 and 46 are a pair of sprockets 48 and 50, each lying in the same plane and adapted to engage a chain 52 which passes over sprocket 50 and under sprocket 48. The free end 54 of the chain adjacent sprocket 48 is secured to a clevis 56 which in turn is secured to a tension cable 58 adapted to operate a vehicle wheel brake linkage. The other end of the chain after passing over sprocket 50 is provided with a U-shaped fitting 59 which is connected to a spring 60 which maintains the chain under tension. Interengaging axially extending lugs 62 and 64 on sector gear 40 and sprocket 48 are adapted to transmit counterclockwise rotation of sector gear 40 to sprocket 48 and to permit relative rotation between the sector gear 40 and the sprocket 48 when the former is rotated clockwise. Similarly interengaging axially extending lugs 66 and 68 on sector gear 42 and sprocket 50 are adapted to transmit clockwise rotation of sector gear 42 to sprocket 50, and to permit relative rotation between the sector gear 42 and sprocket 50 whenever the former rotates counterclockwise. Thus regardless of the direction of rotation of the friction discs, the chain 52 will always move in the same direction to tension the cable 58.

In order to apply the friction discs 28 and 30 into engagement with the spider carried disc 24, a pair of relatively rotatable levers 70 and 72 are rockably mounted on the hollow stub shaft 26. Each of the levers has conical recesses 74 and 76 in their adjacent faces with spherical balls 75 jointly retained in the recesses, so that relative rotation between the levers results in axial spreading. Thrust bearings 78, 80 and collar 82 transmit the axial spreading action to the friction discs 28 and 30 to cause frictional engagement with disc 24. The collar 82 also is of such diameter as to form a guide for the chain on sprocket 48 and tends to prevent the same from jumping therefrom.

The lever 70 is connected to a control cable 84 which may be operated by a brake pedal. The lever 72 is provided with a roller 86 adapted to engage a cam 88 pinned to the stub shaft 44 which shaft is keyed to the sector gear 40. The cam is preferably of the double variety so as to permit clockwise rotation of lever 72 as the brake is applied, thus giving a follow up in the control cable 84 as to the extent of brake application.

As may be seen, the cam 88 is so formed that its high point contacts with the roller 86, when the roller is in its normal position, as shown. Rotation of the shaft 44 allows the roller to ride down from the high point of the cam and allows the lever 72 to rotate in a clockwise direction. This rotation of the lever 72 in the clockwise direction is therefore in the same direction as the rotation of the lever 70 to apply the brakes, and thus relieves to a certain extent the applying action caused by the relative movement of the levers cooperating with the action of the spherical balls in the conical recesses 74 and 76. Thus it is necessary for the operator to continue applying movement to the pedal in order to continue the application of the brakes. In view of the relatively small radius of the cam 88 and its relatively small departure from concentricity, the follow-up movement of the pedal is small, relative to the movement of the cable 58 in applying the brakes.

Figure 5:
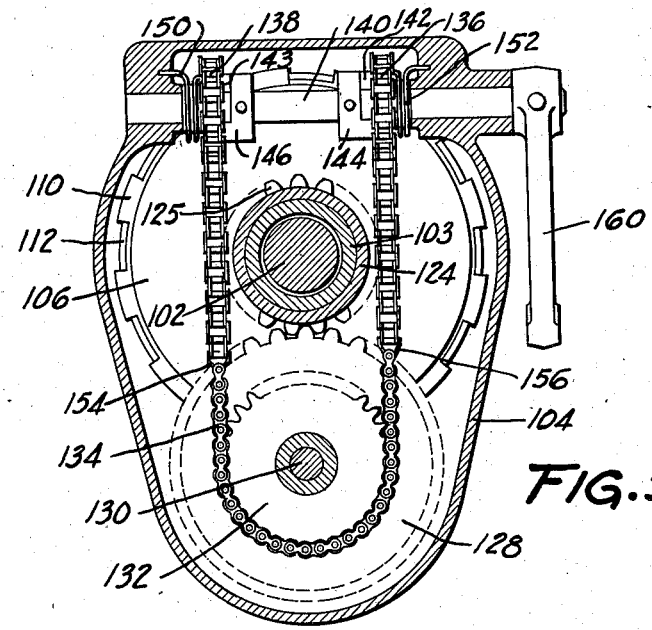
Figure 5 is an end view of a modified form of mechanical power device shown partly in section.
Figure 6:
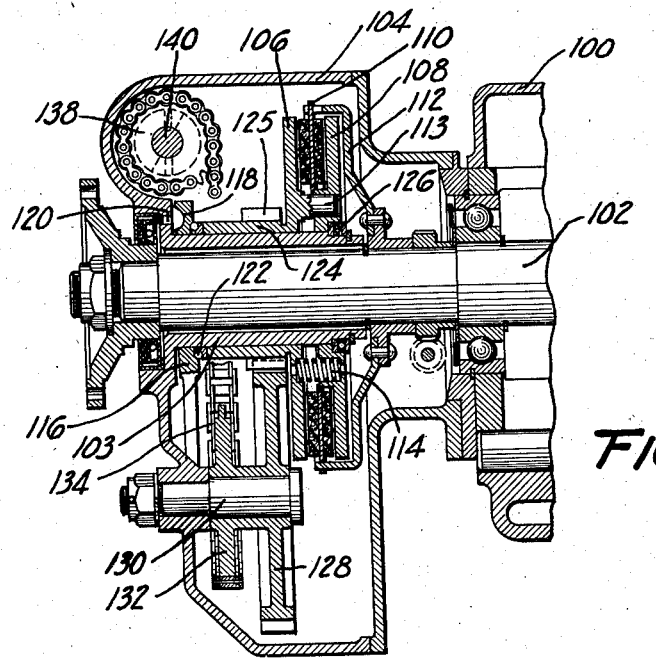
Figure 6 is a longitudinal section of the form of Figure 5.

A modified form illustrating the invention is shown in Figures 5 and 6 wherein the transmission casing 100 having a drive shaft 102 extending from the rear thereof is provided with a housing 104 for enclosing the mechanical power take-off. Surrounding the shaft 102 is a stationary hollow stub shaft 103 secured to the housing 104 and on which are mounted relatively stationary friction discs 106 and 108 which are adapted to engage the rotating annular disc 110 carried by the rotary shaft driven spider 112. The discs 106 and 108 are slidably pinned together as at 113 and provided with release springs 114 arranged in opposed sockets in the discs. Frictional engagement of the discs is accomplished by a lever 116 rotatably mounted on the hollow shaft 103 and provided with conical recesses 118 adapted to engage spherical studs 120 carried by the casing side wall whereby rotation of the lever causes axial movement thereof. The axial movement is transmitted to the friction discs through a thrust bearing 122 and a sleeve 124 integral with the disc 106. Thrust reaction is taken care of by a thrust bearing 126 located on the other side of the friction disc 108. The lever 116 may be operated by a cable passing out of the casing as is illustrated in Figures 1 to 4.

The sleeve 124 is provided with a gear 125 adapted to mesh with a gear 128 mounted on a stub shaft 130 below the main shaft. The gear 128 drives a sprocket 132 having a chain 134 therearound, the ends of which extend upwardly in the casing and around a pair of sprockets 136 and 138 on a transverse shaft 140 to which sprockets the ends of the chain are affixed. The sprockets 138 and 136 are provided with axial extending lugs 142 and 140 which are adapted to engage lugs carried by collars 146 and 144, whereby rotation of either sprocket 138 clockwise will rotate shaft 140 clockwise, and whereby rotation of either sprocket counterclockwise is permitted free of the shaft 140. In order to maintain the chain reasonably taut spiral springs 150 and 152 may be provided to tend to rotate both sprockets in a counterclockwise direction. Also to compensate for the right angle between the axes of the sprockets 138 and 136 and 132, the chain is provided with angle pieces 154 and 156. The shaft 140 is provided with a suitable crank or lever 160 which may be connected to a suitable vehicle wheel brake system.

Figure 7:
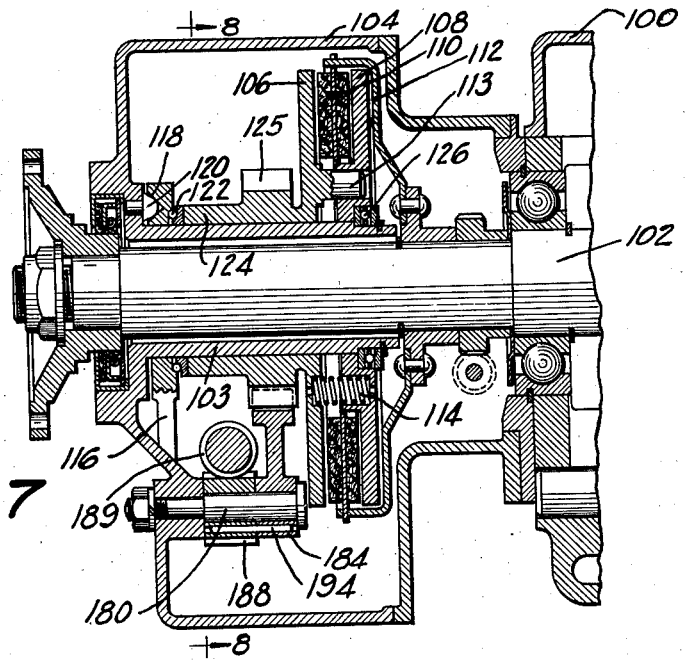
Figure 7 is a further modified form of the invention showing a longitudinal section thereof.
Figure 8:
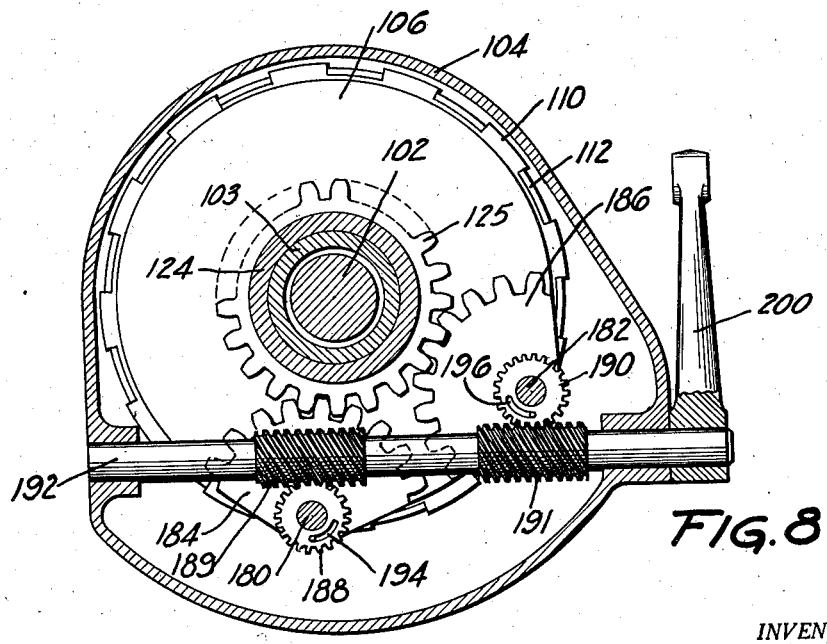
Figure 8 is a transverse section of Figure 7 taken on the line 8—8.

The modified form of Figures 5 and 6 illustrated in Figures 7 and 8 differs only in the manner of deriving a torque from the friction disc driven gear 125 which is carried on the hollow shaft 103. In this form, the casing is provided with a pair of stub shafts 180 and 182 each carrying a sector gear 184 and 186 adapted to mesh with the gear 125. Adjacent each sector gear on their respective studs are provided 45° spiral gears 188 and 190, each adapted to engage a corresponding spiral gear 189 and 191 arranged on a single transverse shaft 192. A pin and slot connection 194 between sector gear 184 and spiral gear 188 causes rotation of the latter upon clockwise rotation of the former. Similarly a pin and slot connection 196 between sector gear 186 and spiral gear 190 causes rotation of the latter upon counterclockwise rotation of the former. The spiral gear 188 and 190 however, are free to overrun their adjacent sector gears 184 and 186, and the arrangement is such that rotation of the friction discs 106 and 108 in either direction will cause rotation of the shaft 192 in the same direction, and this shaft may be provided with a crank arm 200 for operating a vehicle wheel brake system.

Operation of all the above modifications is such as to produce a uni-directional brake applying force in response to actuation of the friction device to produce engagement thereof regardless of the direction of rotation of the friction device.

Although several embodiments of the invention are illustrated, it is to be understood that the invention is not limited thereto but may be embodied in many varied mechanical arrangements. For example substitutions of the various elements of one combination or modification may be made for the corresponding elements of another. As such and many other changes may be made in the construction and arrangement of parts without departing from the spirit of the invention as will be apparent to those skilled in the art, reference will be had to the appended claims for a definition of the limits of the invention.

What is claimed is:

1. In a mechanical power brake, a wheel driven drive shaft, means for frictionally deriving torque therefrom including a pinion and means associated with said torque deriving means including a pair of sector gears, a sprocket driven by each of said gears and a chain wrapped on said pair of sprockets for actuating wheel brakes regardless of the direction of rotation of said drive shaft.

2. In a mechanical power brake, a wheel driven drive shaft, a friction disc driven thereby, concentric friction discs for engagement with said friction disc, means for engaging said discs in varying degree, a pinion driven by said friction discs, a pair of pinions in mesh with said driven pinion mounted on eccentric stub shafts and means for employing the rotation of one pinion when in one direction and the other pinion in the other direction for applying vehicle wheel brakes regardless of the rotation direction of said friction discs.

3. In a mechanical power brake, a wheel driven drive shaft, a friction disc driven thereby, concentric friction discs for engagement with said friction disc, means for engaging said discs in varying degree, a pinion driven by said friction discs, a pair of pinions in mesh with said driven pinion mounted on eccentric stub shafts, means for employing the rotation of one pinion when in one direction and the other pinion in the other direction for applying vehicle wheel brakes regardless of the rotation direction of said friction discs, and means for modifying said engaging means in accordance with the rotation of one of said pinions.

4. A mechanical power brake for automotive vehicles comprising a wheel driven drive shaft, a friction disc driven thereby, concentric friction discs for engagement with said friction disc, means for engaging said discs in varying degree, a gear driven by said friction discs, a pair of pinions driven by said gear, and means comprising a chain driven by one of said pinions when rotating in one direction, and driven by the other of said pinions when rotating in another direction.

5. A mechanical power brake for automotive vehicles comprising a wheel driven drive shaft, a friction disc driven thereby, concentric friction discs for engagement with said friction disc, means for engaging said discs in varying degree, a pair of members driven by said concentric friction discs, and means driven by one of said members when the discs are rotating in one direction, means driven by the other of said members when the discs rotate in the opposite direction, and means for connecting both of said last named means to a vehicle braking system.

6. A mechanical power brake for automotive vehicles comprising a wheel driven drive shaft, a friction disc driven thereby, a concentric friction disc for engagement with said first-named friction disc, means for causing the engagement of said discs, a gear driven by said concentric friction disc, a pair of pinions driven by said gear, a pair of sprockets, one driven by each of said pinions, and a chain driven by one of said sprockets when the discs are rotating in one direction and driven by the other of said sprockets when the discs are rotating in the other direction.

7. A mechanical power brake for automotive vehicles comprising a wheel driven drive shaft, a friction disc driven thereby, a concentric friction disc for engagement with said first-named friction disc, means for causing the engagement of said discs, a gear driven by said concentric friction disc, a pair of pinions driven by said gear, a pair of sprockets, one driven by each of said pinions, a chain driven by one of said sprockets when the discs are rotating in one direction and driven by the other of said sprockets when the discs are rotating in the other direction, and a spring connected to one end of said chain.

8. A mechanical power brake for automotive vehicles comprising a wheel driven drive shaft, a friction disc driven thereby, a concentric friction disc for engagement with said first-named friction disc, means for causing the engagement of said discs, a pair of members driven by said concentric friction disc, a sprocket having a one-way clutch to one of said members and driven by said member when the discs are rotating in one direction, a sprocket having a one-way clutch to the other of said members and driven by said other of said members when the discs are rotating in the opposite direction, and means comprising a chain passing over one sprocket and under the other for connecting said sprockets to the vehicle braking system.

9. A mechanical power brake for automotive vehicles comprising a drive shaft, a pair of members arranged to be driven thereby, a sprocket having a one-way clutch to one of said members and driven by said member when the shaft is rotating in one direction, a sprocket having a one-way clutch to the other of said members and driven by said other of said members when the shaft is rotating in the opposite direction, and means comprising a chain passing over one sprocket and under the other for connecting said sprockets to the vehicle braking system.

10. In a mechanical power brake; a wheel driven drive shaft; a friction disc driven thereby; a concentric friction disc for engagement with said first-named friction disc; means comprising an applying lever and a releasing lever, each having a recess, balls retained in said recess, and means for rotating said applying lever for causing the engagement of said friction discs; a pinion driven by said concentric friction disc; a pair of toothed members, each in mesh with said driven pinion and both mounted on eccentric stub shafts; means for using the rotation of one toothed members when driven in one direction and the other toothed member when driven in the other direction for applying vehicle brake wheels, regardless of the direction of rotation of said friction discs; and means for modifying said engaging means in accordance with the rotation of one of said toothed members, said last-named means comprising a shaft secured to one of said toothed members and rotated thereby, a cam secured to said shaft, a roller secured to said releasing lever and contacting said cam.

11. In a mechanical power brake; a wheel driven drive shaft; a friction disc driven thereby; a concentric friction disc for engagement with said first-named friction disc; means comprising an applying lever and a releasing lever, each having a recess, balls retained in said recess, and mean for rotating said applying lever for spreading said levers for causing the engagement of said friction discs; a pinion driven by said concentric friction disc; a pair of toothed members, each in mesh with said driven pinion and both mounted on eccentric stub shafts; means for using the rotation of one toothed member when driven in one direction and the other toothed member when driven in the other direction for applying vehicle brake wheels, regardless of the direction of rotation of said friction discs, comprising a pair of sprockets, each connected to one of said toothed members by a one-way clutch, a chain passing over one of said sprockets and under the other, and a spring secured to said chain; and means for modifying said engaging means in accordance with the rotation of one of said toothed members, said last-named means comprising a shaft secured to one of said toothed members and rotated thereby, a cam secured to said shaft; a roller secured to said releasing lever and contacting said cam.

12. In a mechanical power brake, a wheel driven drive shaft, means for frictionally deriving torque therefrom and means associated with said torque deriving means including a pair of movable members, one adapted to be moved by rotation of said deriving means in one direction, and the other adapted to be moved by rotation of said deriving means in the other direction, and tension means connected to both of said moving means to transmit a brake applying force from movement of one member or movement of the other, said tension means causing simultaneous movement of both members in the same direction that they would be individually moved by said deriving means and associated means.

LUDGER E. LA BRIE.